United States Patent
Elby et al.

(10) Patent No.: US 12,101,623 B2
(45) Date of Patent: *Sep. 24, 2024

(54) SYNTHESIZING AUDIO OF A VENUE

(71) Applicant: Sphere Entertainment Group, LLC, New York, NY (US)

(72) Inventors: Stuart Elby, Westport, CT (US); Erik Hockman, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,437

(22) Filed: Oct. 2, 2023

(65) Prior Publication Data

US 2024/0031761 A1 Jan. 25, 2024

Related U.S. Application Data

(63) Continuation of application No. 17/465,120, filed on Sep. 2, 2021, now Pat. No. 11,812,251, which is a (Continued)

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01); *H04S 2400/11* (2013.01); *H04S 2400/15* (2013.01)

(58) Field of Classification Search
None
See application file for complete search history.

(56) References Cited

U.S. PATENT DOCUMENTS

| 5,119,425 A | 6/1992 | Rosenstrach et al. |
| 5,119,428 A * | 6/1992 | Prinssen ................ H04R 27/00 381/83 |

(Continued)

FOREIGN PATENT DOCUMENTS

| EP | 2930671 A1 | 10/2015 |
| EP | 3052719 A2 | 8/2016 |
| WO | WO 2014132280 A2 | 9/2014 |

OTHER PUBLICATIONS

International Search Report and Written Opinion of the International Searching Authority directed to related International Patent Application No. PCT/US2020/056332, mailed May 2, 2021; 21 pages.

(Continued)

*Primary Examiner* — Duc Nguyen
*Assistant Examiner* — Assad Mohammed
(74) *Attorney, Agent, or Firm* — Sterne, Kessler, Goldstein & Fox P.L.L.C.

(57) ABSTRACT

Disclosed herein are system, method, and computer program product embodiments for replicating a remote venue in a local venue. An embodiment operates by receiving original audio. Thereafter, the original stream of audio is modified to produce modified audio based on an audio profile unique to a remote venue smaller than the local venue. The audio profile comprises a virtual representation of the remote venue including (i) a virtual audio source corresponding to the local venue's audio source and configured to produce the original audio and (ii) a virtual reverberation point corresponding to a real-world location in the remote venue and the portion of the local venue. As such, the modified audio is determined based on receipt of the original audio from the reverberation point. Thus, after correlating the modified audio to the local venue's audio source, the modified audio (Continued)

is provided by the audio source to the portion of the local venue.

20 Claims, 12 Drawing Sheets

Related U.S. Application Data continuation of application No. 16/678,811, filed on Nov. 8, 2019, now Pat. No. 11,202,162.

(60) Provisional application No. 62/923,205, filed on Oct. 18, 2019.

(56) References Cited

U.S. PATENT DOCUMENTS

| | | | |
|---|---|---|---|
| 9,693,009 | B2 | 6/2017 | Farrell et al. |
| 10,754,511 | B2 | 8/2020 | Birkbrck et al. |
| 11,202,162 | B2 | 12/2021 | Elby et al. |
| 2002/0067835 | A1 | 6/2002 | Vatter |
| 2005/0210512 | A1 | 9/2005 | Anderson et al. |
| 2009/0080632 | A1 | 3/2009 | Zhang et al. |
| 2010/0073468 | A1 | 3/2010 | Kutner |
| 2010/0150359 | A1* | 6/2010 | Knickrehm ............ G09B 23/14 381/71.7 |
| 2013/0208903 | A1 | 8/2013 | Ojala |
| 2013/0321566 | A1 | 12/2013 | Simonnet |
| 2015/0297949 | A1 | 10/2015 | Aman et al. |
| 2018/0227694 | A1 | 8/2018 | King |
| 2018/0335832 | A1 | 11/2018 | Hardy et al. |
| 2019/0105568 | A1 | 4/2019 | Platt et al. |
| 2019/0387350 | A1 | 12/2019 | Audfray et al. |
| 2021/0120356 | A1 | 4/2021 | Elby et al. |
| 2021/0120358 | A1 | 4/2021 | Elby et al. |

OTHER PUBLICATIONS

International Search Report and Written Opinion of the International Searching Authority directed to related International Patent Application No. PCT/US2020/056336, mailed Aug. 21, 2018; 14 pages.

* cited by examiner

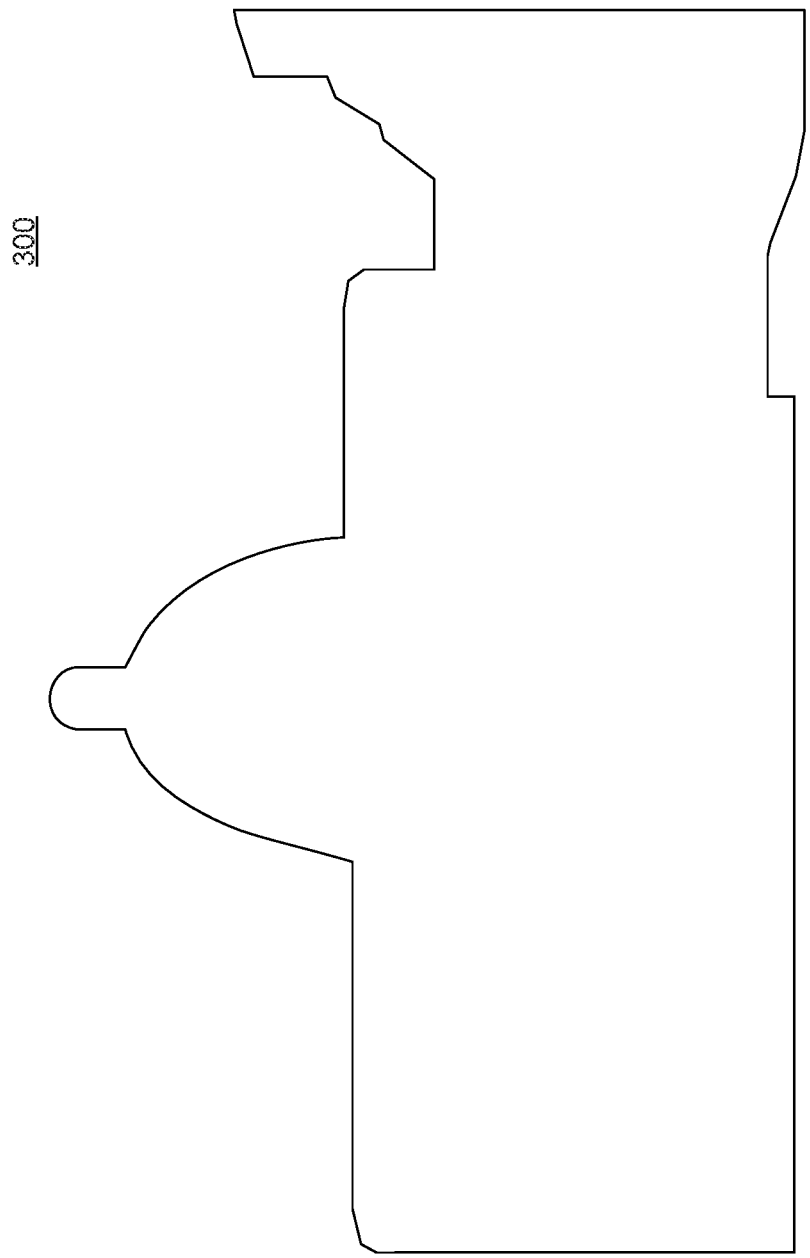

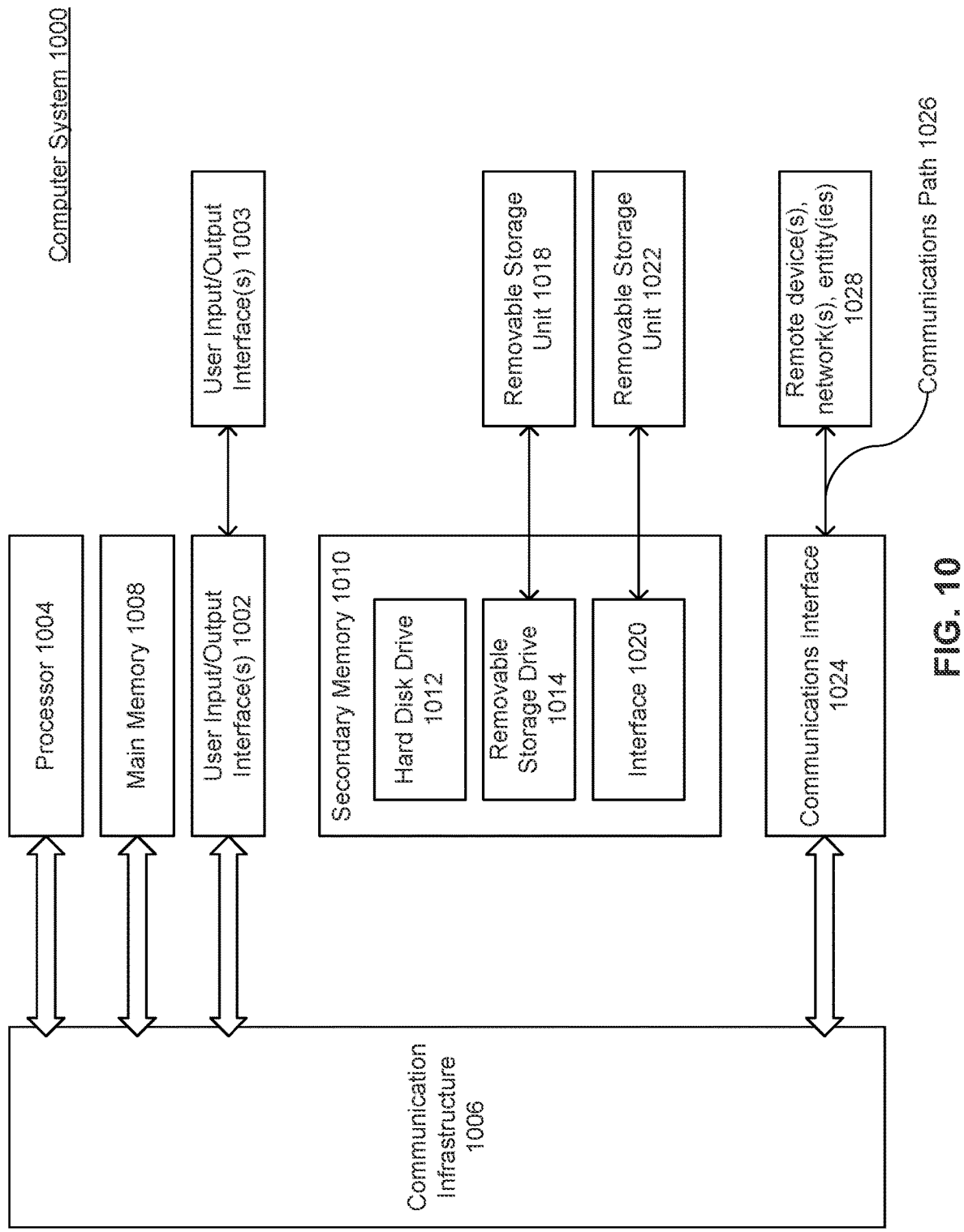

SYNTHESIZING AUDIO OF A VENUE

CROSS-REFERENCE RELATED APPLICATION

This application is a continuation of U.S. patent application Ser. No. 17/465,120, filed on Sep. 2, 2021, which is a continuation of U.S. patent application Ser. No. 16/678,811, filed on Nov. 8, 2019, now U.S. Pat. No. 11,202,162, which claims priority to U.S. Provisional Application No. 62/923,205, filed on Oct. 18, 2019. U.S. patent Application Ser. No. 16/678,811, filed on Nov. 8, 2019 and U.S. patent application Ser. No. 17/465,120, filed on Sep. 2, 2021 are incorporated herein by reference in their entirety.

BACKGROUND

A given musical act (e.g., a singer such as Celine Dion or a band such as Green Day) will typically perform two or more times at the same venue in the same city. For example, each time Green Day returns to New York City, it may perform in Madison Square Garden. Moreover, a band such as Phish might perform for a series of consecutive days at the same venue, such as Madison Square Garden. Although such musical acts will often change the set list of songs played each night, fans might be less inclined to see the same act perform multiple times at the same venue. Rather, fans planning to see the same act perform multiple times might stay away from attending multiple performances at the same venue and might prefer to see the act play in different venues. Unfortunately, this might not be possible. Either because there are not multiple venues in the same city which can accommodate the act, or because traveling to different venues might be prohibitive for the fans. Instead, what is needed is a way for a musical act to perform multiple times at the same venue, but the performances to appear to fans as if it they were being performed in multiple different venues.

BRIEF DESCRIPTION OF THE FIGURES

The accompanying drawings are incorporated herein and form a part of the specification.

FIGS. 3A-B illustrates an example remote venue capable of being represented in the local venue of FIG. 1, according to some embodiments.

FIG. 10 illustrates an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for providing a virtual representation of a remote venue in a local venue.

The present disclosure is directed to permitting the selection of a remote venue to be replicated visually and acoustically in a local venue. For example, a performer may virtually perform a world tour in different cities at the same venue. As such, the performer may select to perform at Red Rocks one night and at St. John the Devine the following night. Thus, this disclosure enables continuously representing various remote venues in a local venue while providing audio and/or video true to the remote venues in the local venue.

The present disclosure incorporates by reference concurrently filed U.S. application Ser. No. 16/678,792, titled "Mapping Audio to Visual Images on a Curved Display Device," which features may be combined with those of the present disclosure for synchronously presenting audio of a remote venue with images provides on a three-dimensional displace in a local venue.

Figure 1:
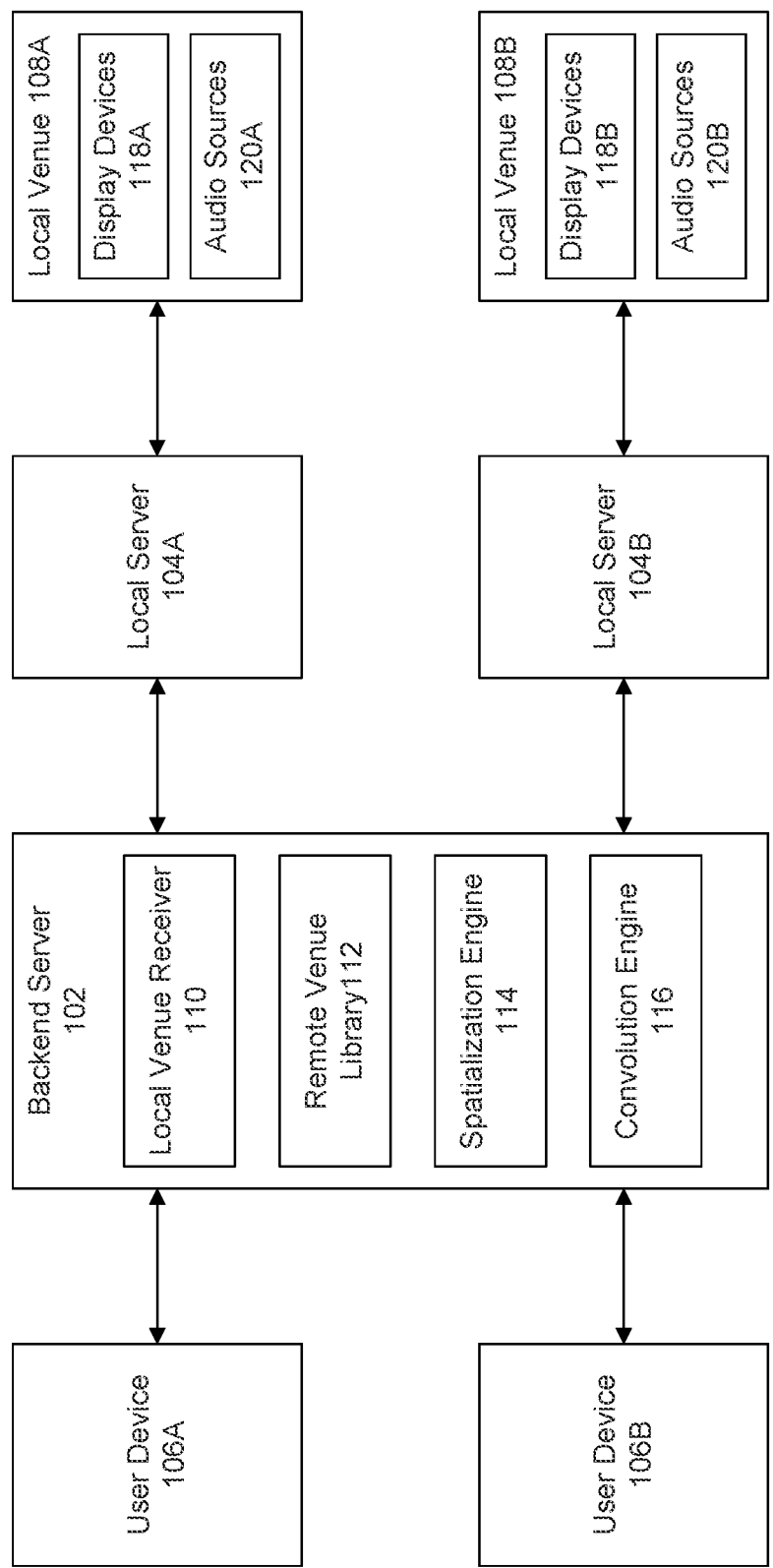
FIG. 1 illustrates a block diagram of a system for providing a representation of a remote venue in a local venue, according to some embodiments.

FIG. 1 illustrates a system 100 for providing an audio and video representation of a remote venue in local venues 108A-B. System 100 includes backend server 102 in communication with local servers 104A-B and user devices 106A-B. As will be discussed in more detail below, backend server 102 creates a virtual representation of a remote venue for providing local venues 108A-B with a visual and audio representation of the remote venue. Backend server 102 sends the virtual representation of the remote venue to local servers 104A-B. Local servers 104A-B manage video and audio reproduction of the remote venue in the local venues 108A-B. In some embodiments, although not illustrated, backend server 102 and local servers 104A-B may be a single server that performs their combined functions.

Backend server 102 includes a local venue receiver 110, a remote venue library 112, a spatialization engine 114, and convolution engine 116. Local venue receiver 110 stores dimensions of an interior portion of the local venues 108A-B providing the audio presentation, a configuration and location of audio sources 120A-B in local venues 108A-B, a location of a stage (or where a performer typically performs) in local venues 108A-B, and/or a location of possible attendees (e.g., seats) in local venues 108A-B. As such, local venue receiver 110 may store a distance between audio sources 120A-B in the local venues 108A-B, a distance from each audio source 120A-B to the stage in the local venue 108A-B.

Figure 2A:
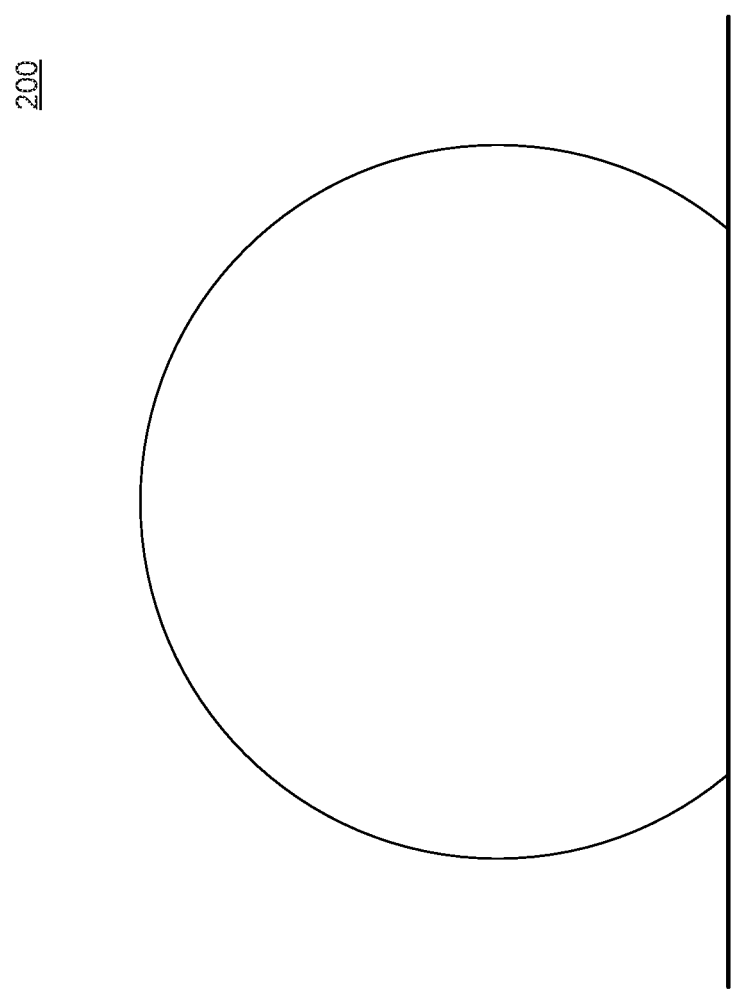
FIGS. 2A-B illustrate an example local venue of FIG. 1, according to some embodiments.
Figure 2B:
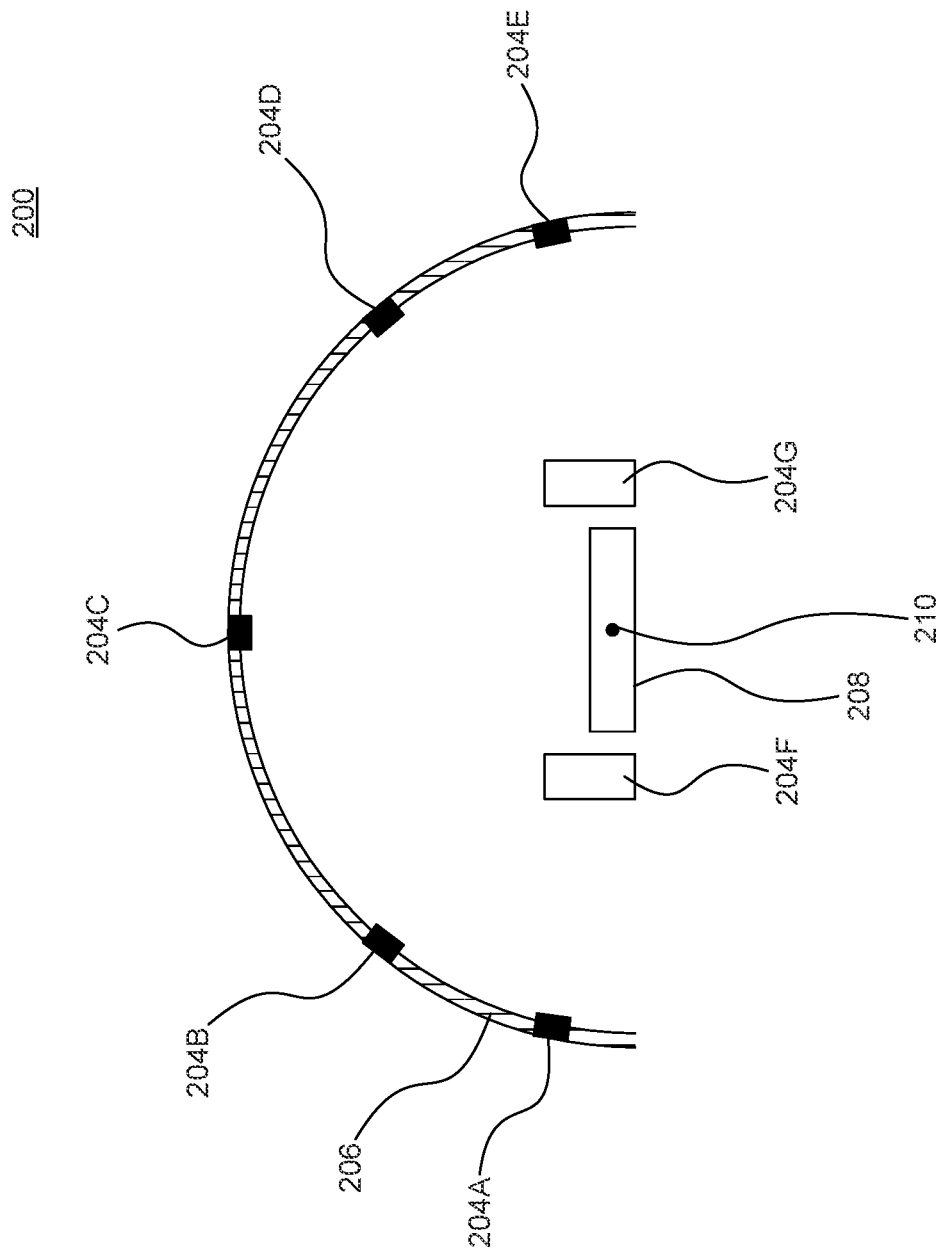

FIGS. 2A-B illustrate an example local venue 200. As illustrated in FIG. 2A, the local venue 200 may be shaped as a dome. As such, as shown in FIG. 2B, the local venue 200 may have an interior surface for providing audio sources 204A-E to provide audio. The interior surface may also provide display devices 206 to provide images. The display devices 206 may follow the shape of the interior surface and thus may also be curved. As such, the display devices 206 may provide a curved display and partially or surrounds local venue 200's attendees or seats. In doing so, the display devices 206 may partially surround venue 200's attendees or seats to provide them with an immersive view of image renderings. This may provide viewers with a full 360×180 view of the remote venue. The local venue 200 may include audio sources 204F-G, which may be arranged in an array and correspond to different portions of the image displayed via the display devices 206. The local venue 200 may further include a stage 204 for performers to perform. The backend server 102 and/or local servers 104A-B (of FIG. 1) may determine and utilize a middle point 210 of stage 204.

Referring back to FIG. 1, backend server 102's remote venue library 112 stores various remote venues that can be presented in the local venues 108A-B. The remote venue may be a real-world location or a fictitious location. The remote venue may be an outdoor venue or indoor value. As such, the remote venue may be a traditional venue that holds events (e.g., Times Square, Red Rocks Amphitheatre, The Gorge Amphitheatre, Hollywood Bowl, and Telluride park) or an untraditional venue that typically does not hold events (e.g., a beach, a park). Along these lines, the remote venue may be an atypical location for holding events, such as a location that does not permit events or people to enter. Some atypical locations include the Coliseum or Sistine Chapel in Rome, Italy, or Buckingham Palace in London, England, just to provide a few examples. Moreover, the remote venue may be smaller or larger than the local venue.

Figure 3B:
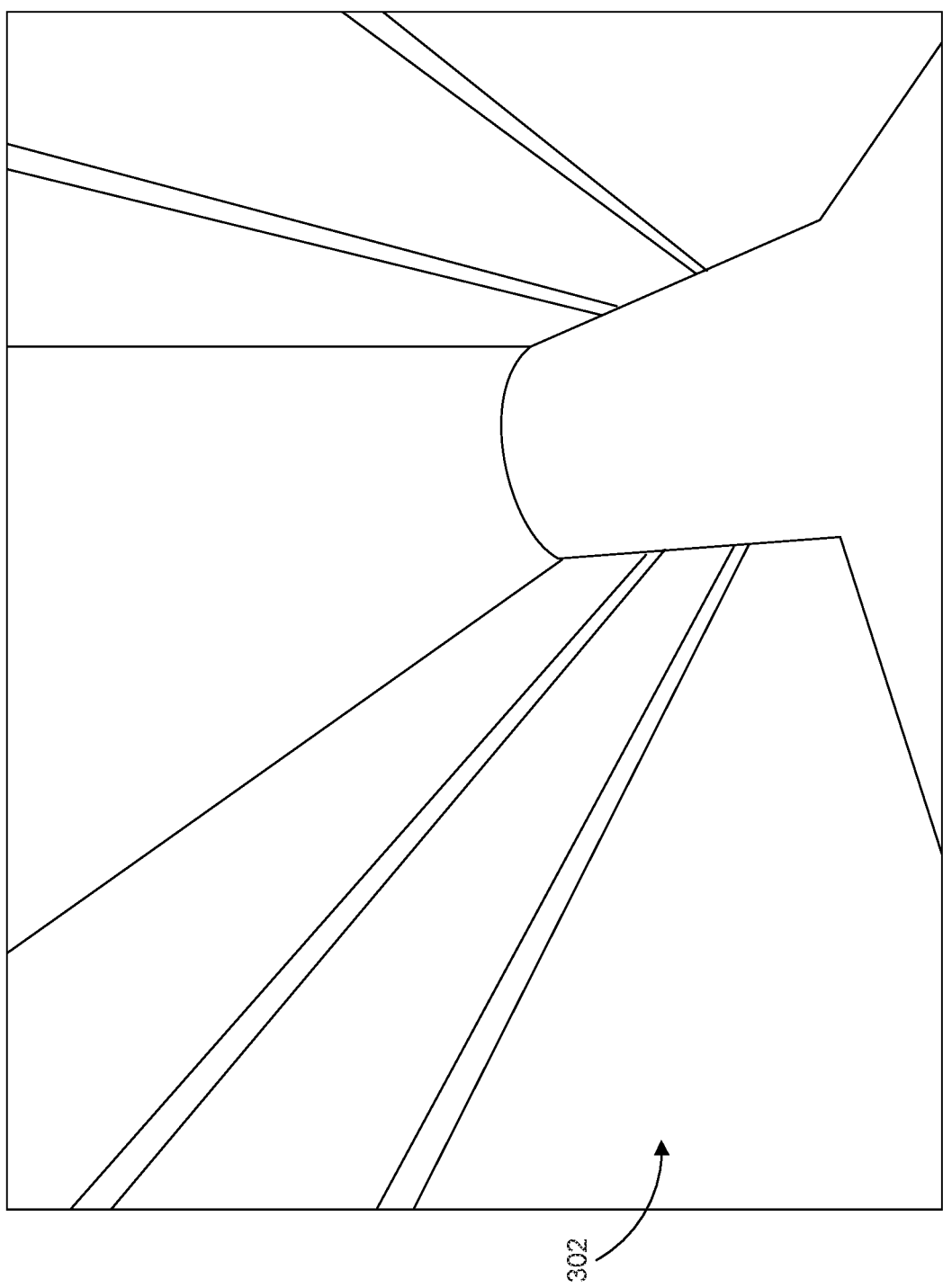

FIGS. 3A-B illustrates an example remote venue 300. As illustrated in FIG. 3A, remote venue 300 may be a church and thus may be an untraditional venue that does not hold events. Thus, as shown in FIG. 3B, remote venue 300 may have an interior area 302 for presenting audio and/or video that has an interior surface 302 having a different shape and/or size than the interior surface of the local venue 200 (of FIG. 2B). Along these lines, remote venue 300 may also be composed of a different structure (e.g., concrete, wood, and stucco) than the local venue 200 (of FIG. 2B). Further, remote venue 300 may be a different geographical location than local venue 200, which may result in different environmental considerations (e.g., humidity, weather condition, noise pollution, etc.). Any of the aforementioned factors may affect the reflectivity of audio waves provided in the remote venue 300 and thus affect the perception of audio at remote venue 300.

As such, prior systems were unable to accurately represent audio in remote venues 300 somewhat different than local venues 108A-B (of FIG. 1). In an attempt to do so, prior systems would acquire a single acoustic sample of the remote venue 300, typically at the center of the remote venue 300, and attempt to produce audio throughout the local venue 108A based on the single acoustic sample of the remote venue 300. However, prior systems did not account for the aforementioned factors unique to the remote venue. For example, prior systems did not account for the fact that audio waves may reflect in remote venue 300 differently. And for this reason, people at different locations of remote venue 300 may perceive audio differently.

Figure 4:
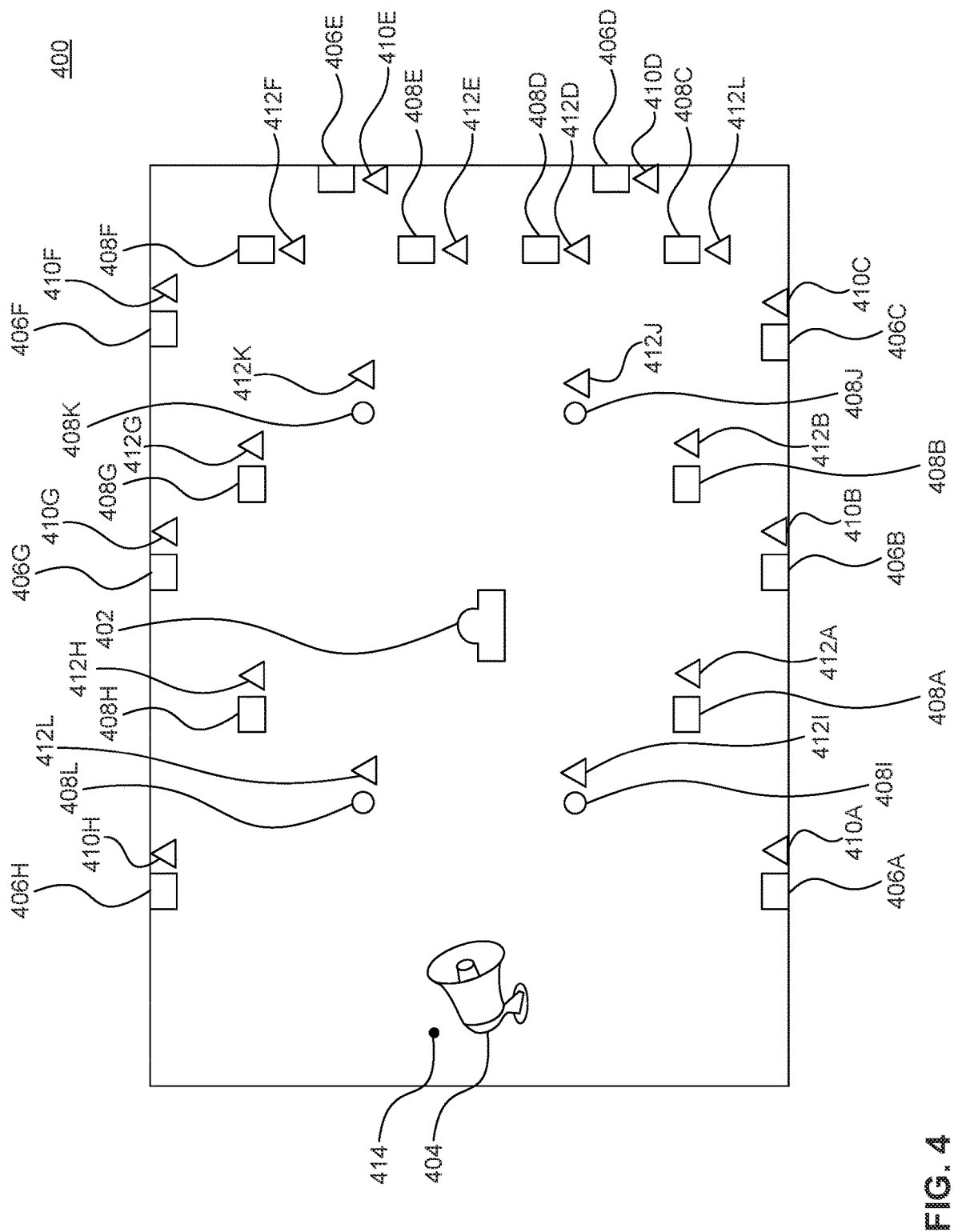
FIG. 4 illustrates a method of acquiring a virtual representation of the remote venue of FIGS. 3A-B, according to some embodiments.

To overcome these challenges, referring now to FIG. 1, backend server 102's spatialization engine 114 stores or creates a virtual representation of remote venue 300's interior area 302 (of FIG. 3B). FIG. 4 illustrates a method for acquiring the virtual representation of remote venue 400. The virtual representation includes an image portion and an audio portion. To derive the virtual representation's virtual portion, optical device 402 acquires images of remote venue 400. Optical device 402 may be a camera (e.g., a multi-camera array) and acquire single still images. As such, images may be acquired from a single point of view or multiple points of view.

Along these lines, optical device 402 may record a video of images to replayed on local venue 200's display devices 206 (of FIG. 2B). For example, the optical device 402 may record a video of a beach having an ocean with splashing waves. This can be provided in the local venue 200 to provide the perception that they are on the beach.

As discussed above, local venue 200's display devices 206 (of FIG. 2B) may provide a 360-degree perception of remote venue 400. As such, images may be acquired from different angles and locations to permit an attendee at each possible location in local venue 200 to view an appropriation portion of the remote venue 400. For example, if one attendee is in the back corner and another attendee is in the front, opposing corner of remote venue 400, the attendee in the back corner will have a different view than the attendee in the front, opposing corner of remote venue 400.

Although remote venue 400 is a building having a closed interior, remote venue 400 may be completely in the open (e.g., on a beach) or partially exposed to the outside (e.g., without a roof). Accordingly, where remote venue 400 is partially exposed to the outside, images are acquired at all locations and angles such that all attendees in local venue 200 (of FIG. 2B) view the appropriate portions of remote venue 400 and the outside. And, where remote venue 400 is completely in the open, a user of user der devices 106A-B first defines an area to acquire the fingerprint. Thereafter, images are acquired at all locations and angles such that all attendees in local venue 200 (of FIG. 2A-B) view the appropriate portions of remote venue.

To acquire the virtual representation's audio portion, backend server 102's spatialization engine 114 (of FIG. 1) determines reverberations at various locations throughout the remote venue 400. To do so, spatialization engine 114 derives an origin point 414, reflection points 406, and reverberation points 408A-L in remote venue 400 to determine reverberations. Origin point 414 corresponds to middle point 210 of local venue 200's stage 208 (of FIG. 2B) or another predetermined point in local venue 200. Audio source 404 is then placed origin point 414. Audio generator 310 may be a pistol or a form of audio, just to provide an example.

Reflections points 406A-H are points in the remote venue 400 that reflect audio. As such, an authorized individual may select reflection points. This may be based on the interior region of the remote venue. For example, if the remote venue has a unique interior portion, a reflection point 406A-H may be provided thereon. Moreover, reflection points 406 may be based on the location of audio sources 204A-E in local venue 200 (of FIG. 2B). As such, the locations of reverberation points 408A-L in the remote venue 400 may correspond to locations of audio sources 204A-E in local venue 200. In turn, the number reverberation points 408A-L in remote venue 400 may correspond to the number of audio sources 204A-E in local venue 200. Further, an optimal number of reflection points 406 may be selected based on the location and/or the size of the local venue.

Reverberation points 408A-L are placed a distance away from reflection points 406A-H. An authorized individual may preselect the distance, which may be based on the size of the remote venue. In some embodiments, where the remote venue 400 is smaller than the local venue 200 (of FIG. 2B), reverberation points 408A-L in remote venue 400 may be less than the number of audio sources 204A-E (of FIG. 2B) in the local venue 200. Further, where the remote venue 400 is smaller than the local venue 200, a single reverberation point 408A-L of remote venue 400 may correspond to multiple audio sources 204A-e. Moreover, where the remote venue 400 is larger than local venue 200, reverberation points 408A-L of remote venue 400 may be greater than the number of audio sources 204A-E in local venue 200.

Accordingly, first audio receivers 410A-H (e.g., microphones) are placed at or near reflection points 406A-H in remote venue 400. And, second audio receivers 412A-L (e.g., microphones) are placed at or near reverberation points 408A-L in remote venue 400. Audio source 404 then provides audio and audio receivers 410A-H/412A-L at reflection and reverberation points 406A-H/408A-L receives the audio. As such, for each respective reflection point 406A-H, the associated audio receivers 410A-H/412A-L may receive audio from audio source 404.

In some embodiments, the effect of the reflection points 406A-H may be detected collectively. For example, first and second audio receivers 410A-H/412A-L may receive the audio provided by audio source 404 at the same time. In some embodiments, the effect of the reflection points 406A-H may be determined individually. For example, for reflection point 406A, associated first and second audio receivers 410A/412A receive audio from audio source 404. Thereafter, for each reflection point 406B-H, associated first and second audio receivers 410B-H/412B-H received audio from audio source 404 sequentially. However, as discussed above, depending on the size of the remote venue with respect to the local venue, additional second audio receivers 412A-L may correspond to the same reflection point 406A or first audio receiver 412A-L.

Along these lines, audio source 404 may provide audio in multiple predetermined directions in remote venue 400. For example, when the effect of the reflection points 406A-H are determined collectively and thus first and second audio receivers 410A-H/412A-L receives audio from audio source 404 at the same time, audio source 404 may be directed sequentially at each of the reflection points 406A-H. Alternatively, when the effect of the reflection points 406A-H is determined individually and variously associated first and second audio receivers 410A/412A receive audio from audio source 404 at different times, the audio source 404 may be directed at the reflection point 406A-H be analyzed. For example, if reflection point 406A is being analyzed, the audio source 404 may be directed at reflection point 406A. As such, this may be performed sequentially for each of the remaining reflection points 406B-H.

Moreover, audio source 404 may provide audio at different sound pressure levels (SPLs) (e.g., decibels) within a predetermined frequency range (e.g., from 20 Hz to 20 kHz). Furthermore, audio source 404 may be moved to different locations in the remote venue 400. As such, audio receivers 410A-H/412A-L at reflection points 406A-H and reverberation points 408A-L throughout remote venue 400 may receive audio from an audio source 404 at different locations and different SPLs.

Along these lines, while deriving the reverberations, environmental audios unique to the remote venue may be derived and recorded at the reverberation points 408A-L. Examples of environmental audio include waves breaking and seagulls at a beach, echoing footsteps in a church, and wind and rustling leaves in the outdoors, just to provide a few examples. The environmental audio may be mixed with the modified stream of audio and may be provided at a frequency lower than the modified stream of audio.

The spatialization engine 114 (of FIG. 1) then determines or measures reverberations at each reverberation point 408A-L in remote venue 400 and SPL provided by audio source 404. As understood by a person of ordinary skill in the art, reverberation refers to the persistence of audio after the audio is produced and includes a time required for the audio to fade away. Reverberation time of the remote venue 400 is based on real-world characteristics of remote venue 400, such as an architectural design (e.g., size, shape, and materials) of remote venue 400 and objects (e.g., water, mountains, furniture, building structure) in or around remote venue 400, just to provide a few examples. As such, the reverberations in remote venue 400 are unique to remote venue 400. Thus, the reverberations for the reverberation points may include different delays and/or frequency-dependent level variations, depending on the remote venue 400 and the location in the remote venue 400.

The spatialization engine 114 (of FIG. 1) also may create a virtual representation of remote venue 400, optionally after deriving the reverberations for the reverberation points 408A-L. As the remote venue is three-dimensional, the virtual representation may also be three-dimensional. As such, where remote venue 400 is an indoor venue having structural portions, the virtual presentation may depict various structural portions of the indoor venue. In turn, some of these structural portions of remote venue 400 may be different than corresponding structural portions of local venue 108A-B (of FIG. 1). Thus, reflection points 406A-H and second audio receiver 412A-L may be provided at structural portions of remote venue 400 different than corresponding structural portions of local venues 108A-B.

Figure 5:
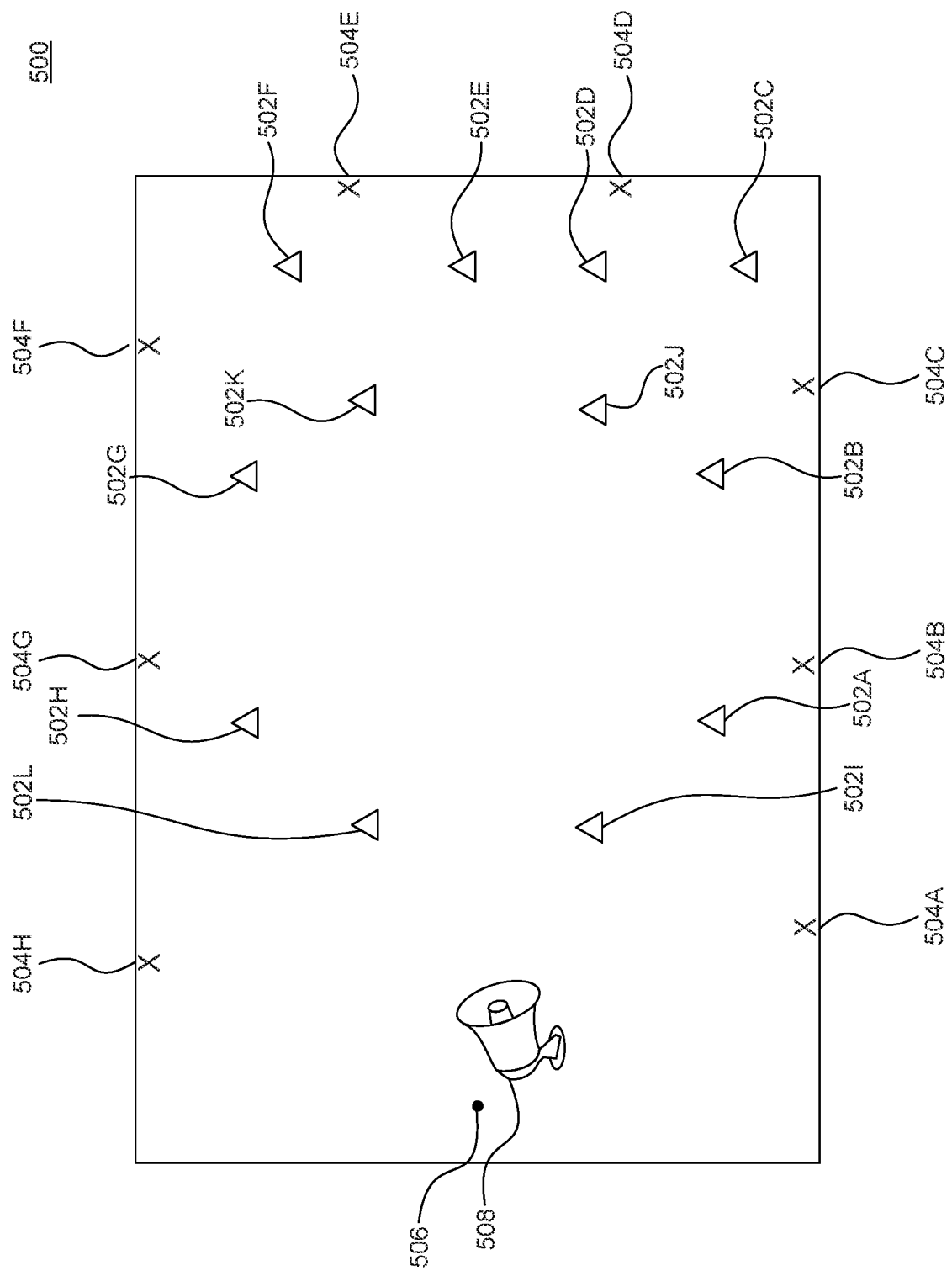
FIG. 5 illustrates the virtual representation derived from the method of FIG. 4, according to some embodiments.

FIG. 5 illustrates an example virtual representation 500 of remote venue 400 (of FIG. 4). Virtual representation 500 includes virtual reverberation points 502A-L, virtual speakers 504A-H, a virtual origin point 506, and a virtual audio source 508. Virtual reverberation points 502A-L correspond to reverberation points 408A-L (of FIG. 4) and reverberations determined by spatialization engine 114 (of FIG. 4) relating to the reverberation points 408A-L as discussed above. As such, virtual reverberation points 502A-L may have a three-dimensional position in the virtual representation corresponding to the reverberation points 408A-L in the remote venue 400.

Virtual audio sources 504A-L correspond to local venue 200's audio sources 204A-E (of FIG. 2B). Although not illustrated in these figures, the number of virtual audio sources 504A-L equals the number of audio sources 204A-E. As such, the virtual audio sources 504A-L may have a three-dimensional location in the virtual representation 500 of the remote venue that corresponds to the three-dimensional location of the local venue 200's audio sources 204A-E. For example, the virtual audio sources 504A-L may have the same spatial relationship with respect to the virtual origin point 506 in the virtual representation as to the audio sources 204A-E with respect to the middle point 210 of local venue 200's stage 208 (of FIG. 2B) or predetermined point in local venue 200.

Virtual origin point 506 corresponds to the same middle point 210 of local venue 200's stage 208 (of FIG. 2B), or the same predetermined point in local venue 200, as origin point 414 (of FIG. 4). Virtual audio source 508 corresponds to an audio source provided in local venue 200, which may be part of a prerecorded video or a live performer. Accordingly, virtual audio source 508 moves in the virtual representation based on the movement of the audio source in the prerecorded video or live performance.

As such, the virtual audio source 508 may transverse and rotate in the virtual representation 500 based on the movement of the audio source 120A-B in the local venue 108A-B (of FIG. 1). Thus, the local server 104A-B may track and send the movement of the audio source 120A-B to the backend server 102 (of FIG. 1). For example, if the audio source 120A-B moves left to right in the local venue 104A-B, the audio source 508 may move accordingly in the virtual representation. Moreover, if the audio source rotates 30 degrees in a certain direction in the local venue, the audio source 508 may rotate accordingly in the virtual representation.

Along these lines, the virtual audio source 508 may change size in the virtual representation 500 based on a degree of focus of a video camera recording images of the audio source of the local venue. As such, based on the size of the virtual audio source 508 in the virtual representation 500, the audio reproduced by the virtual audio source 508 may be modified accordingly. For example, if the video camera focuses on the audio source such that the audio source is depicted at two times a normal magnification level, the virtual audio source 508 may be doubled in size and reproduce audio twice as loud, relative to the other audio source, as normal in the virtual representation 500. Conversely, if the video camera expands the field of view such that the magnification level is half of the normal magnification level, the virtual audio source 508 may be half of its normal size and reproduced audio half as loud, relative to the other audio source, as normal in the virtual representation 500.

As such, the virtual representation 500 incorporates reverberation points 502A-L determined in the real-world remote venue 400 (of FIG. 4) and replications of properties of the audio sources in the local venue 200 (of FIG. 2B).

Figure 6:
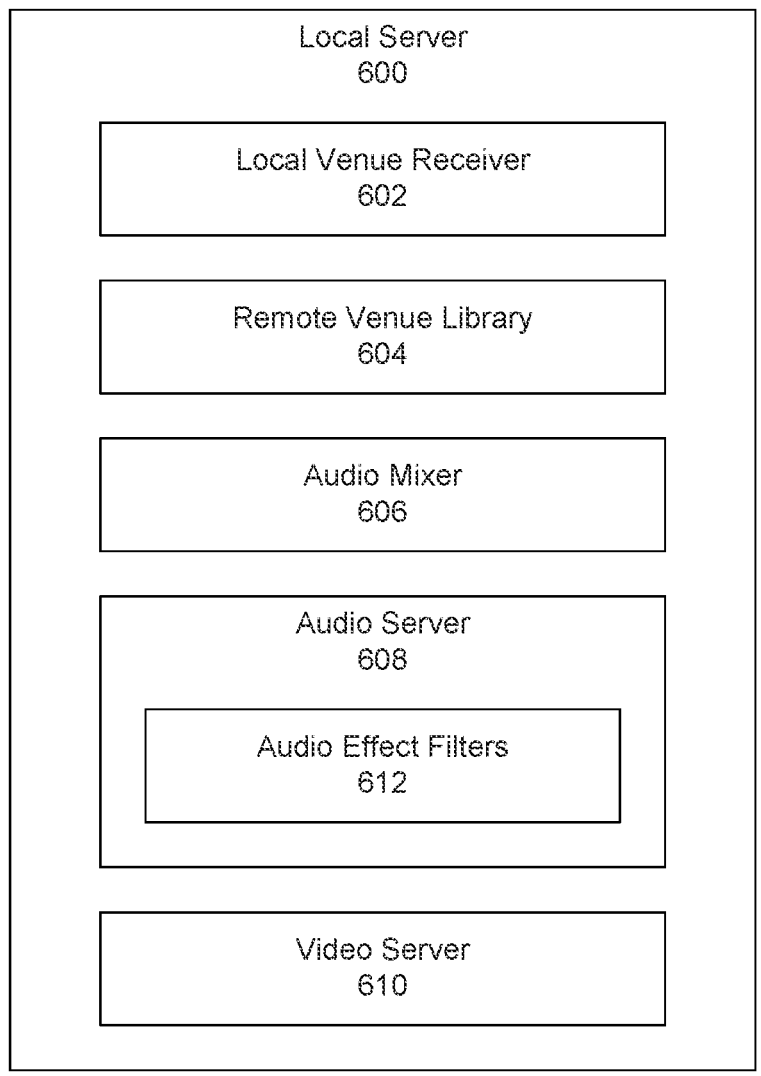
FIG. 6 illustrates an example local server of FIG. 1, according to some embodiments.

Referring back to FIG. 1, local servers 104A-B may provide the audio and video to the local venue 108A-B's display devices 118A-B and audio sources 120A-B, respectively. FIG. 6 illustrates an example local server 600 of the local venues 108A-B (of FIG. 1). Local server 600 includes the local venue receiver 602, remote venue library 604, audio mixer 606, audio server 608, and video server 610. Like backend server 102's local venue receiver 110 (of FIG. 1), local venue receiver 602 stores dimensions of an interior portion of the local venues 108A-B providing the audio presentation, a configuration and location of audio sources 120A-B in local venues 108A-B (of FIG. 1), a location of a stage (or where a performer typically performs) in local venues 108A-B, and/or a location of possible attendees (e.g., seats) in local venues 108A-B. As such, local venue receiver 602 may store a distance between audio sources 112A-B in the local venues 108A-B, a distance from each audio source 120A-B to the stage in the local venue 108-B.

Also like backend server 102's remote venue library 112 (of FIG. 1), remote venue library 604 stores audio and video of various remote venues that can be presented in the local venues 108A-B (of FIG. 1). Remote venue library 604 also stores virtual representations for the remote venues.

Audio mixer 606 receives live audio from a local venue. The audio mixer 606 may receive prerecorded audio from a video provided in the local venue 200. Alternatively, the audio mixer 606 may receive audio from a live performer in the local venue 200. In some embodiments, as described above, the audio mixer 606 receives audio from multiple live performers in the local venue.

Audio server 608 comprises audio effect filters 612 to mirror the reverberation points of the remote venues. The audio effect filter 612 may be based on the virtual representation of the remote venues. Accordingly, the audio effect filters 612 identify reverberations for different portions of the remote venue based on the corresponding reverberation points in the virtual representation of the remote venue. The audio effect filters 612 then applies the reverberations of the different portions of the remote portion so that audio having the reverberations can be replayed in corresponding portions the local venue, thereby allowing the local venue to replicate the remote venue acoustically.

Video server 610 receives images or video of the remote venue from the remote venue library 604 and/or from the local venue.

Figure 7:
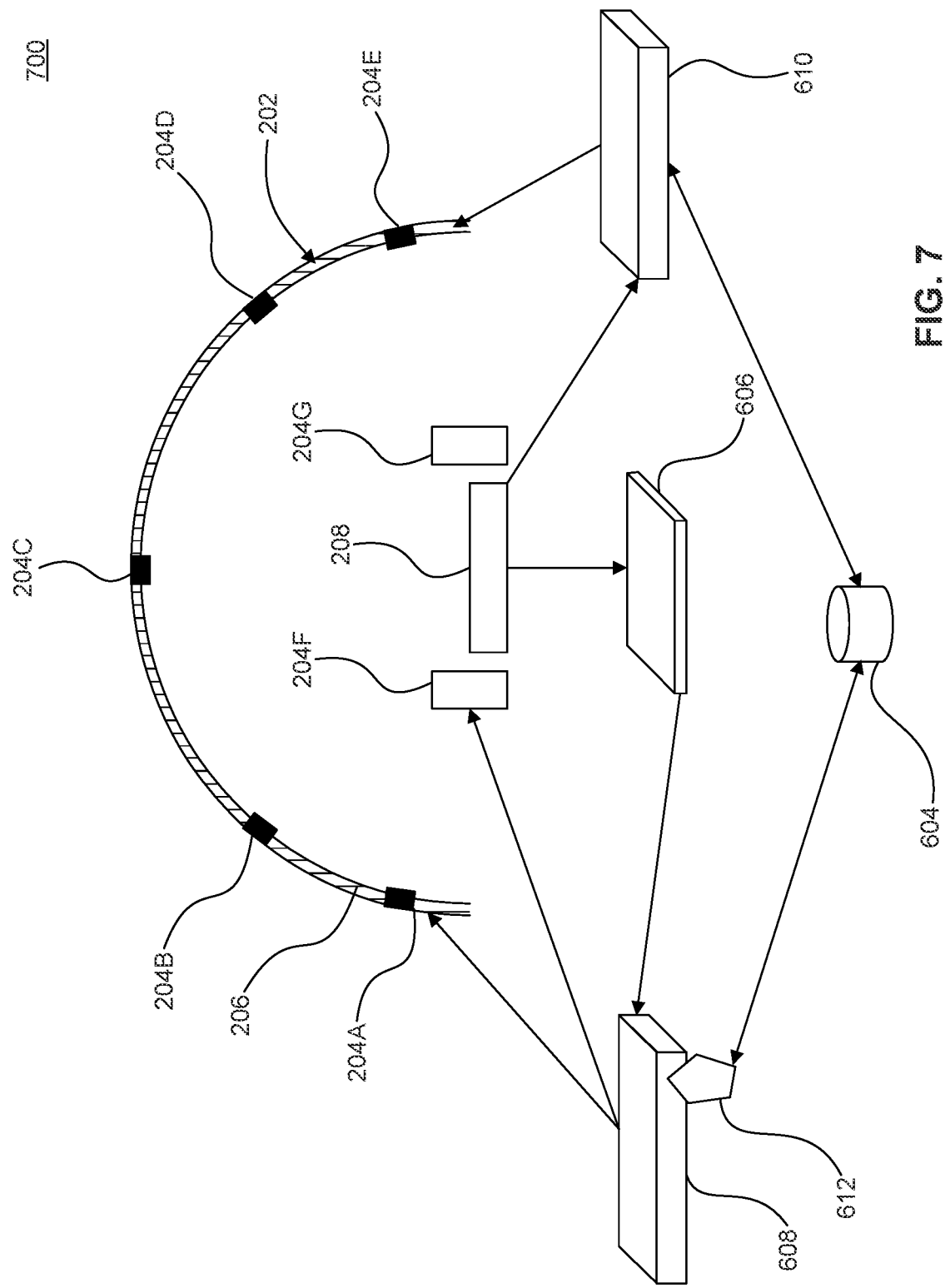
FIG. 7 illustrates an example block diagram of the components of the local server of FIG. 6 that provide audio and video of a remote venue to the local venue of FIGS. 2A-B, according to some embodiments.

FIG. 7 illustrates an example block diagram of the components of the local server 600 (of FIG. 6) providing audio and video of a remote venue to local venue 200 (of FIGS. 2A-B). As described above, local venue 200 may be shaped as a dome. As such, the local venue 200 may have an interior surface for providing audio sources 204A-E to provide audio. The interior surface may also provide display devices 206 to provide images. The display devices 206 may follow the shape of the interior surface and thus may also be curved. As such, the display devices 206 may provide a curved display and partially or surrounds local venue 200's attendees or seats, thereby providing them with an immersive view of image renderings. This may provide viewers with a full 360×180 degree view of the remote venue. The local venue 200 may include audio sources 204F-G, which may be arranged in an array and correspond to different portions of the images displayed via the display devices 206 (e.g., images depicted of a remote venue or provided onto those of the remote venue and belonging to the local venue). The local venue 200 may further include a stage 204 for performers to perform.

As such, audio server 608 receives the virtual representation of the remote venue 200 from the remote venue library 604. Audio server 608 derives audio effect filters 612 based on the reverberation points in the virtual representation of the remote venue 200.

Audio server 608 also receives audio from audio mixer 606, which receives audio from local venue 200. Audio server 608 determines reverberations for audio sources 204A-G of the local venue based on the audio effect filters 612 of the remote venue. As such, audio sources 204A-G of the local venue 200 may provide audio to attendees replicating audio that the attendees would hear in corresponding areas in the remote venue. For example, if audio sources 204A/E provide audio to a first and second area of local venue 200 that corresponds to a first and second area of the remote venue, audio sources 204A/204E provide modified audio to the first and second portions of local venue 200 having reverberations. The modified audio corresponds to audio provided in the first and second portions of the remote venue. Along these lines, the audio sources 204A/204E may provide different reverberations.

As stated above, video server 610 receives images of the remote venue from the remote venue library 604 and/or images from the local venue 200. Video server 610 modifies images of the remote venue and/or of local venue based on the shape of the display devices 206 of the local venue 200 to provide the attendees of the local venue 200 with an accurate representation of the remote venue.

As such, the video server 610's images may include audio sources (e.g., live performers or of a movie) in local venue 200. The video server 610's images may also be part of a prerecorded video (e.g., a movie) provided in the local venue. Accordingly, the video server 610's images may depict an audio source moving and continually modify the images to present the visual representation of the audio source more accurately.

Along these lines, the video server 610 provides different images of the remote venue to the appropriate portions (e.g., a first and second portion) of the local venue 200's display devices 206 so that an accurate visual representation of the remote venue is provided in the local venue. And, as noted above, the audio server 608 provides different modified portions of the original audio (e.g., a first and second modified portion) to the appropriate local venue 200's audio sources 204A-G so that an accurate acoustic representation is provided in the local venue 200. Accordingly, the audio and video servers 608/610 may send the images and modified streams of audio synchronously, for example, by being based on a time sequence.

Referring back to FIG. 1, as discussed above, backend server 102 may further include the convolution engine 116. Convolution engine 116 performs the functions of the local server 104A-B. As such, convolution engine 116 may determine a view of images presented by the display devices 118 of the local venues 108A-B at various locations in the local venues 108A-B. Similarly, convolution engine 116 may determine a location of audio provided by audio sources 120A-B of the local venues 108A-B at various locations in the local venues 108A-B.

As such, via backend server 102's convolution engine 116 and user devices 106A-B permit authorized users to review and/or preview imagery and/or audio at different locations in the local venues 108A-B. Along these lines, user devices 106A-B may also permit simulation and/or modeling of remote locations to be presented in local venues 108A-B. The simulation may permit an authorized user to view and/or edit the processing performed by the convolution engine 116 in creating the replication of the remote venue 300. As such, the simulation may permit an authorized user to edit one or more inputs of the convolution engine, such as reverberations of audio in the virtual representation. Moreover, the modeling may permit an authorized user to view imagery and/or listen to audio from predefined points in the venue. The authorized users may then make any suitable modifications to the imagery and/or audio for each predefined point. For example, the authorized user may modify the reverberation of audio, the location of imagery on display devices, and/or mapping of the audio to the imagery. Thus, user devices 106A-B may be in the form of headphones, a display device, and/or a virtual reality headset, just to name a few examples.

Figure 8:
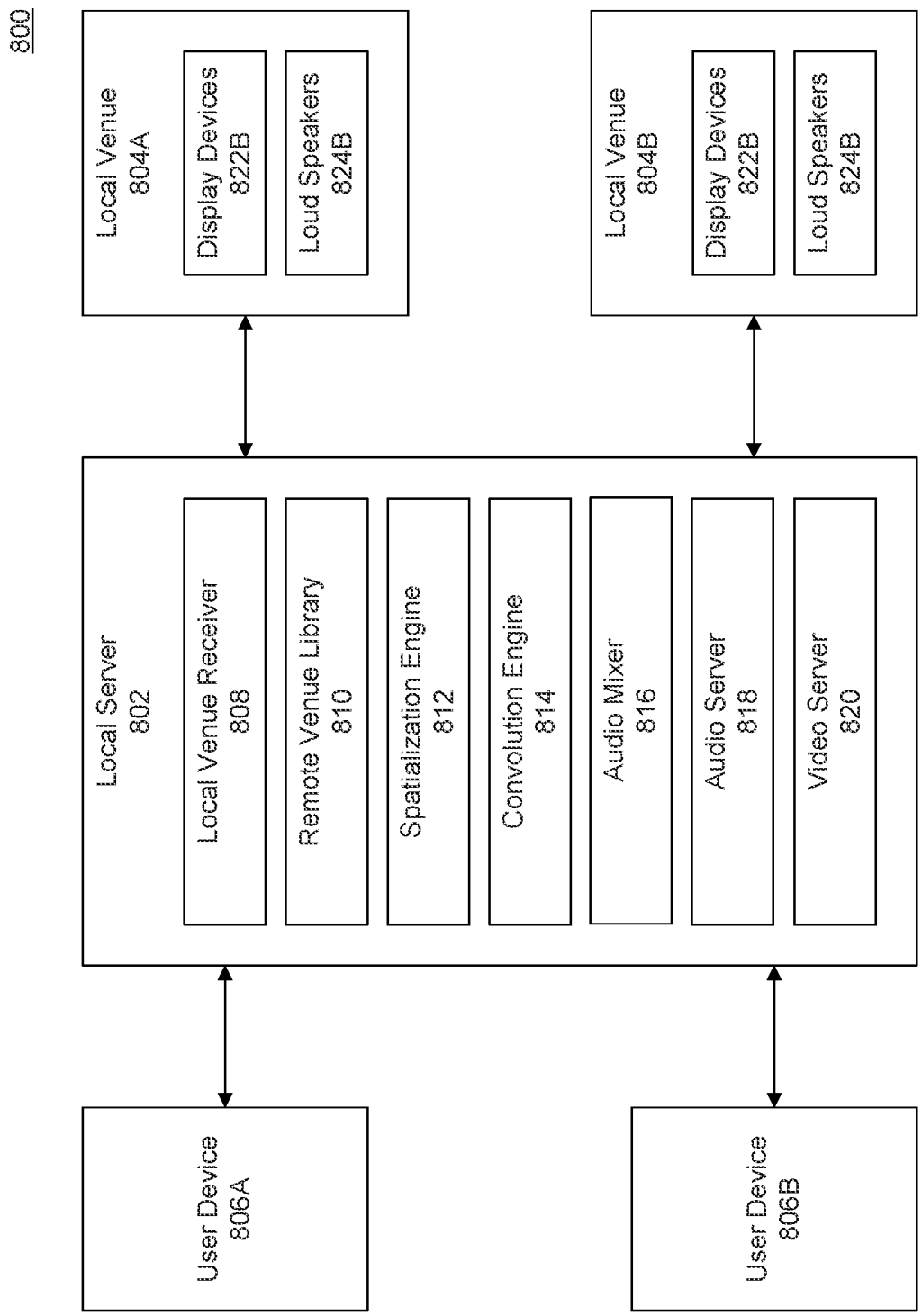
FIG. 8 illustrates a block diagram of an alternative system for providing a representation of a remote venue in a local venue, according to some embodiments.

FIG. 8 illustrates an alternative system 800 for providing an audio and video representation of a remote venue in a local venue 804A-B. System 800 includes backend server 802 in communication local venues 804A-B and user devices 806A-B. In contrast to system 100 of FIG. 1, system 800 does not include local servers 104A-B. Rather, backend server 802 acts as a single server for backend server 102 and local servers 104A-B (of FIG. 1). As such, like backend server 102 (of FIG. 1A), backend server 802 includes local venue receiver 808, remote venue library 810, spatialization engine 812, and convolution engine 814. However, in addition, backend server 802 also includes the additional components of local server 600 (of FIG. 6). As such, backend server 102 further includes audio mixer 816, audio server 818, and video server 820.

Figure 9:
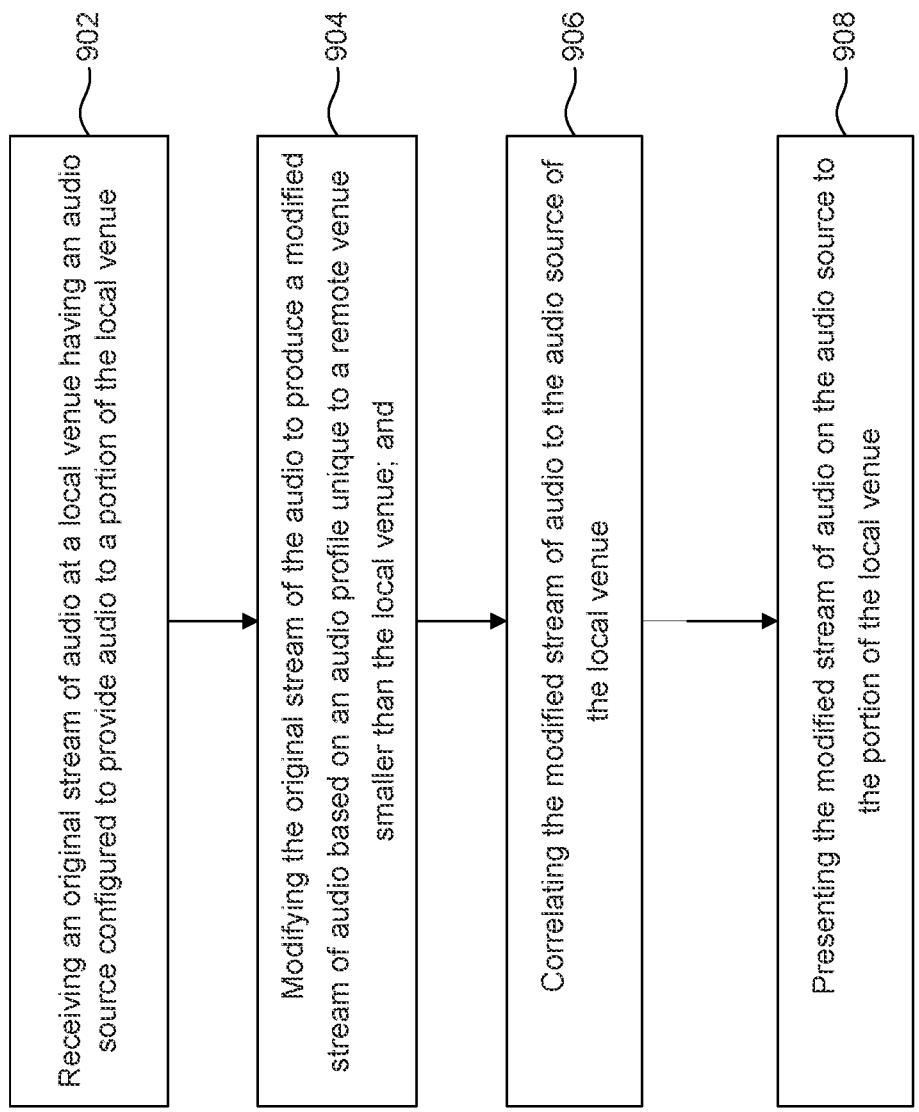
FIG. 9 illustrates a flowchart of an example method for synthesizing audio of a venue, according to some embodiments.

FIG. 9 illustrates a flowchart of a method of replicating a remote venue in a local venue, according to some embodiments. Methods 900 can be performed by processing logic that can comprise hardware (e.g., circuitry, dedicated logic, programmable logic, microcode, etc.), software (e.g., instructions executed on a processing device), or a combination thereof. It is to be appreciated that not all steps may be needed to perform the disclosure provided herein. Further, some of the steps may be performed simultaneously or in a different order than shown in FIG. 9, as will be understood by a person of ordinary skill in the art.

Referring now to FIG. 9, method 900 shall be described with reference to FIGS. 1 and 3A-B. However, method 900 is not limited to those example embodiments.

In 902, the backend server 102 receives an original stream of audio at a local venue 108A. The local venue comprises an audio source 120A configured to provide audio to a portion of the local venue 108A.

In 904, the backend server 102 modifies the original stream of audio to produce a modified stream of audio based on an audio profile unique to a remote venue 300 smaller than the local venue 108A.

The audio profile comprises a virtual representation of the remote venue, which comprises (i) a virtual audio source corresponding to the audio source of the local venue and configured to produce the original stream of audio and (ii) a virtual reverberation point corresponding to a real-world location in the remote venue and the portion of the local venue. The modified stream of audio is determined based on receipt of the original stream of audio from the reverberation point In 906, the backend server 102 correlates the modified stream of audio to the audio source 120A of the local venue 108A such that the stream of images are provided in sync with the modified stream of audio.

In 908, the backend server 102 presents the modified stream of audio on the audio source 120A to the portion of the local venue 108A Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more processors 1004 may be a graphics processing unit (GPU). In an embodiment, a GPU may be a processor that is a specialized electronic circuit designed to process mathematically intensive applications. The GPU may have a parallel structure that is efficient for processing of large blocks of data simultaneously (in parallel as opposed to serially), such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014.

Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer-usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to a removable storage unit 1018.

Secondary memory 1010 may include other means, devices, components, instrumentalities or other approaches for allowing computer programs and/or other instructions and/or data to be accessed by the computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived either extemporaneously or from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for developing an audio profile for sound traveling through a venue, the method comprising:
   identifying, by a computer system, a first plurality of locations of a plurality of reflection points within the venue, the first plurality of locations being based on a second plurality of locations of a plurality of audio sources within a second venue that is different from the venue;
   identifying, by the computer system, a plurality of reverberation points within the venue, each reverberation point from among the plurality of reverberation points being a distance away from a corresponding reflection point from among the plurality of reflection points;
   directing the sound toward a first reflection point from among the plurality of reflection points; and
   analyzing, by the computer system, the sound as received at the first reflection point or as received at a first reverberation point from among the plurality of reverberation points that corresponds to the first reflection point to develop the audio profile for the venue.

2. The method of claim 1, wherein the directing comprises:
   directing, by the computer system, a first audio source from among a plurality of second audio sources within the venue that corresponds to a second audio source from among the plurality of audio sources within the second venue to provide the sound toward the first reflection point; and
   moving the first audio source within the venue based on movement of the second audio source within the second venue.

3. The method of claim 2, wherein the moving comprises moving the first audio source within the venue based on movement of the second audio source in a prerecorded video or a live performance within the second venue.

4. The method of claim 2, wherein the moving comprises transversing and rotating the first audio source within the venue based on the movement of the second audio source within the second venue.

5. The method of claim 1, wherein the identifying the plurality of reverberation points comprises:
   identifying a third plurality of locations of the plurality of reverberation points within the venue, the third plurality of locations corresponding to the second plurality of locations of the plurality of audio sources within the second venue,
   wherein a number of reverberation points from among the plurality of reverberation points is less than a number of audio sources from among the plurality of audio sources when the second venue is smaller than the venue, and
   wherein the number of reverberation points from among the plurality of reverberation points is greater than the number of audio sources when the second venue is larger than the venue.

6. The method of claim 1, wherein the analyzing comprises analyzing, by the computer system, the sound as received at a second reflection point from among the plurality of reflection points or as received at a second reverberation point from among the plurality of reverberation points that corresponds to the second reflection point to develop the audio profile for the venue.

7. The method of claim 1, wherein the directing comprises directing the sound at a sound pressure level (SPL) selected from a plurality of SPLs at a frequency within a predetermined frequency range.

8. The method of claim 1, wherein the analyzing comprises measuring a reflection of the sound at the first reflection point or a reverberation of the sound at the first reverberation point.

9. A computer system for developing an audio profile for sound traveling through a venue, the computer system comprising:
   a memory that stores instructions; and
   a processor configured to execute the instructions stored in the memory, the instructions, when executed by the processor, configuring the processor to:
      identify a first plurality of locations of a plurality of reflection points within the venue, the first plurality of locations being based on a second plurality of locations of a plurality of audio sources within a second venue that is different from the venue,
      identify a plurality of reverberation points within the venue, each reverberation point from among the plurality of reverberation points being a distance away from a corresponding reflection point from among the plurality of reflection points,
      direct the sound toward a first reflection point from among the plurality of reflection points, and
      analyze the sound as received at the first reflection point or as received at a first reverberation point from among the plurality of reverberation points that corresponds to the first reflection point to develop the audio profile for the venue.

10. The computer system of claim 9, wherein the instructions, when executed by the processor, further configure the processor to:
    direct a first audio source from among a plurality of second audio sources within the venue that corresponds to a second audio source from among the plurality of audio sources within the second venue to provide the sound toward the first reflection point; and
    move the first audio source within the venue based on movement of the second audio source within the second venue.

11. The computer system of claim 10, wherein the instructions, when executed by the processor, configure the processor to move the first audio source within the venue based on movement of the second audio source in a prerecorded video or a live performance within the second venue.

12. The computer system of claim 10, wherein the instructions, when executed by the processor, configure the processor to transverse and rotate the first audio source within the venue based on the movement of the second audio source within the second venue.

13. The computer system of claim 9, wherein the instructions, when executed by the processor, further configure the processor to:

identify a third plurality of locations of the plurality of reverberation points within the venue, the third plurality of locations corresponding to the second plurality of locations of the plurality of audio sources within the second venue, wherein a number of reverberation points from among the plurality of reverberation points is less than a number of audio sources from among the plurality of audio sources when the second venue is smaller than the venue, and wherein the number of reverberation points from among the plurality of reverberation points is greater than the number of audio sources when the second venue is larger than the venue.

14. The computer system of claim 9, wherein the instructions, when executed by the processor, configure the processor to analyze the sound as received at a second reflection point from among the plurality of reflection points or as received at a second reverberation point from among the plurality of reverberation points that corresponds to the second reflection point to develop the audio profile for the venue.

15. The computer system of claim 9, wherein the instructions, when executed by the processor, configure the processor to direct the sound at a sound pressure level (SPL) selected from a plurality of SPLs at a frequency within a predetermined frequency range.

16. The computer system of claim 9, wherein the instructions, when executed by the processor, configure the processor to measure a reflection of the sound at the first reflection point or a reverberation of the sound at the first reverberation point.

17. A system for developing an audio profile for sound traveling through a venue, the system comprising:

a first plurality of audio receivers at a first plurality of locations of a plurality of reflection points within the venue, the first plurality of locations being based on a second plurality of locations of a plurality of audio sources within a second venue that is different from the venue;

a second plurality of audio receivers at a plurality of reverberation points within the venue, each reverberation point from among the plurality of reverberation points being a distance away from a corresponding reflection point from among the plurality of reflection points;

a first audio source from among a plurality of second audio sources within the venue that is configured to direct the sound toward a first reflection point from among the plurality of reflection points; and a computer server configured to analyze the sound as received at the first reflection point or as received at a first reverberation point from among the plurality of reverberation points that corresponds to the first reflection point to develop the audio profile for the venue.

18. The system of claim 17, wherein the first audio source is configured to move within the venue based on movement of a second audio source from among the plurality of audio sources within the second venue.

19. The system of claim 18, wherein the first audio source is configured to move within the venue based on movement of the second audio source in a prerecorded video or a live performance within the second venue.

20. The system of claim 18, wherein the first audio source is configured to transverse and rotate within the venue based on the movement of the second audio source within the second venue.

* * * * *